May 12, 1953     W. F. PRIEST     2,638,585
RADIO-LOCATOR SYSTEM
Filed Sept. 2, 1947     2 Sheets-Sheet 1
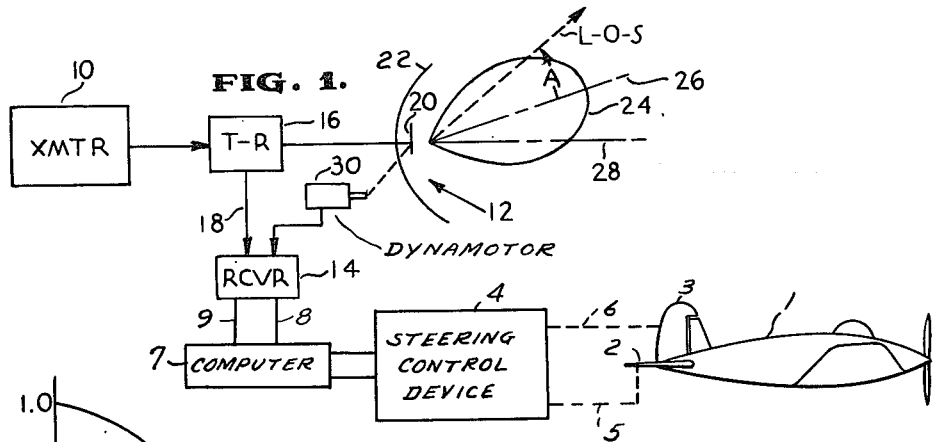
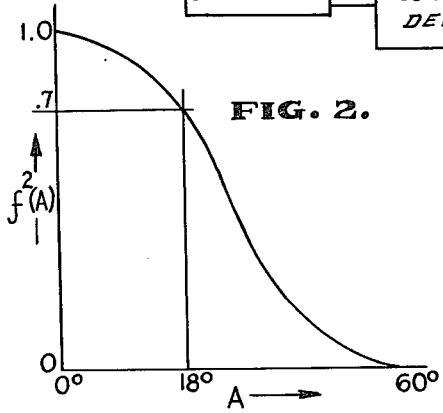
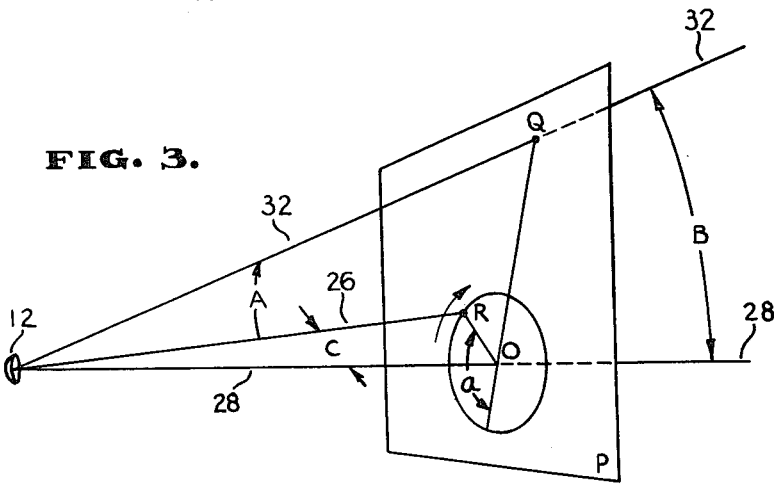
INVENTOR.
WILLIAM F. PRIEST
BY Frank J. Epstein
HIS AGENT May 12, 1953 W. F. PRIEST 2,638,585
RADIO-LOCATOR SYSTEM
Filed Sept. 2, 1947 2 Sheets-Sheet 2

INVENTOR.
WILLIAM F. PRIEST,
BY Frank J. Epstein
HIS AGENT

Patented May 12, 1953

2,638,585

UNITED STATES PATENT OFFICE 2,638,585

RADIO-LOCATOR SYSTEM

William F. Priest, Los Angeles, Calif., assignor to Hughes Tool Company, Houston, Tex., a corporation of Delaware Application September 2, 1947, Serial No. 771,577

9 Claims. (Cl. 343—7)

1

The present invention relates to improved electronic means for determining the line-of-sight to a remote object or target.

A prior electronic system for accomplishing line-of-sight determination, here described for comparison purposes, utilizes radio-echo or radio-locator equipment comprising a transmitter and receiver, a directive antenna structure, and apparatus for imparting large-angle target-searching motions to the antenna structure. When the antenna finds a selected target, as evidenced by signals reflected from the target to the equipment, the large-angle searching movements of the antenna structure are discontinued, and the approximate direction of the line-of-sight to the target is determinable from the training attitude of the antenna. For the purpose of increasing the accuracy with which the antenna trains upon the target, the axis of the antenna beam is caused to swing and trace a conical surface having a relatively small vertex angle at the antenna structure. Echo-signals reflected from the target to the radio-echo equipment thus bear amplitude-modulation, due to the conical scanning motion of the beam, to an extent dependent upon the magnitude of the small angle between the cone axis and the target line-of-sight. This amplitude-modulation characteristic is utilized to control circuits and associated driving equipment which swing the cone axis of the antenna exactly into line with the target, and which cause this alignment to be automatically and continuously maintained despite any relative spatial movements of the target. In this prior system, therefore, the orientation of a target line-of-sight may be determined by the position in which the directive antenna automatically trains.

Since the prior system described above imparts large-angle searching motions to the antenna structure, and trains or points the antenna structure for line-of-sight determination, considerable mounting space must be provided to accommodate the antenna movements. This constitutes a serious disadvantage where the radio-echo equipment must be borne in a relatively small pilotless aircraft or missile, for mounting space and frontal area are there at a premium. In addition, since the antenna must be driven until it is trained on the target, a very rapid and highly accurate follow-up system is required. Furthermore, since such systems employ null-type indications to represent alignment of the target and the antenna, the accuracy of the results obtained is affected by noise and other extraneous signals.

2

The present invention discloses means for determining line-of-sight in which no training of the antenna is required. The mode of operation of the present invention is based upon the discovery that the modulation waveform of the received echo signal in a conical scanning system has a ratio of fundamental to second harmonic components of the scan frequency which is a function of the angle between the line-of-sight and the conical scanning axis, this angle being generally termed the deviation or lead angle. Accordingly, harmonic analysis of the modulation waveform will produce an indication of the magnitude of the lead angle. In addition, the invention discloses means for defining the direction of the line-of-sight relative to the scanning axis. In this manner, both the magnitude and direction of the lead angle are accurately determined by simple conical scanning.

It is therefore an object of the present invention to provide an improved radio-locator system for target-searching and determination of target line-of-sight.

It is another object to provide a radio-locator system utilizing a directive beam subjected only to a conical scanning action.

It is a further object of the present invention to provide a radio-locator system which utilizes the discovery that the modulation waveform of the received signal contains harmonic characteristics which are correlated to the deviation of the target line-of-sight from the antenna axis.

It is still another object of this invention to provide an airborne radio-locator apparatus yielding continuous information, as to direction of a target's line-of-sight, which may be utilized by automatic equipment to control the carrying aircraft's flight course, relative to the target.

These and other objects and features of the present invention will become apparent from the following description made with reference to the accompanying drawings in which:

Figure 1 is a schematic representation of a radio-echo system embodying the instant invention;

Figure 2 is the squared pattern of a directive antenna;

Figure 3 is a perspective diagram of certain spatial relationships involving the antenna and target in the described system;

Figure 4:
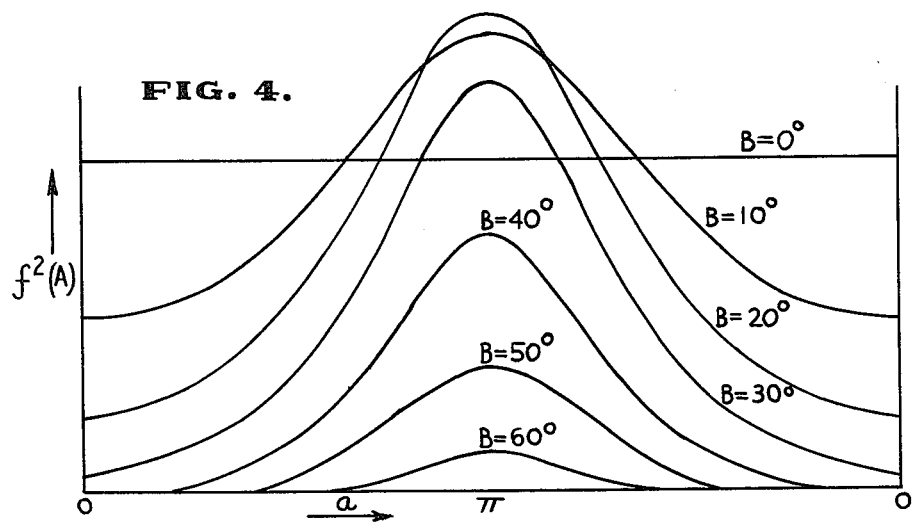
Figure 4 is a graph of echo-signal waveforms.

Referring first to Figure 1, there is shown in diagrammatic form a typical aircraft flight control system embodying the present invention. The controlled aircraft 1 in this instance is of conventional type having elevator and rudder control surfaces 2 and 3, respectively, which may be positioned through the medium of a steering control device 4 by suitable linkages 5 and 6, here illustrated diagrammatically. The type of flight path along which the aircraft may be thus directed, relative to a remote target, is determined by a computer 7 which receives target direction information via leads 8 and 9 from a radio-locator apparatus later described in detail. It is to be understood, however, that the combination of aircraft 1, steering control apparatus 4, and computer 7 may be of any type adapted to make use of the target direction information which is developed at leads 8 and 9 by novel methods and means as later described. It is also to be understood that all of the apparatus, for illustration purposes shown in Figure 1 as lying outside of the aircraft, is to be regarded as mounted in the aircraft itself. Except for the selected pattern of the antenna, the solely conical scanning motion imparted thereto, the selected angle of conical scan, and the manner in which line-of-sight orientation information is derived from returned echo-signals, the radio-locator system is similar to that already described, and its components are conventional. Transmitter 10 includes a modulator and radio-frequency generator which provide a train of search-pulses of extremely short duration and high peak power. These pulses are applied to a directive antenna structure 12 from which they are radiated in a selected beam pattern later described in detail. It is convenient to design the equipment and antenna for operation in the microwave region, in the interests of reducing the physical size of the components. The same antenna 12 also functions to pick up pulses reflected from a remote object or target encountered by the search-pulses, and the reflected or echo-pulses are applied to receiver 14. A T-R box or transmit-receive switch 16, associated with transmitter 10, antenna 12 and receiver 14 as indicated, functions automatically to alternately connect transmitter 10 and receiver 14 to directive antenna 12, as required in this pulse system. During generation of a search-pulse, the transmit-receive switch 16 shorts out the transmission line 18 leading from the switch to receiver 14. The outgoing or search-pulses formed by transmitter 10 are thus applied directly to the antenna 12, and receiver 14 is, during this time, protected from the high-energy search-pulses. Transmit-receive switch 16 otherwise normally functions to connect only receiver 14 to antenna 12. In receiver 14, certain signal characteristics of the echo-pulses are evaluated and transformed into usable line-of-sight information. This line-of-sight information is delivered in the form of two items: (1) a deviation angle voltage substantially proportional to the angular deviation between a conical scan or reference axis and the line-of-sight to a remote target, and (2) a deviation plane voltage which is substantially proportional to the angle between a reference plane, extending through the reference axis, and a plane defined by the reference axis and the line-of-sight. These two voltages thus completely define the orientation or direction of the line-of-sight relative to the carrying aircraft, for the antenna is to be understood as having its conical scan or reference axis fixed in position relative to the aircraft.

Antenna 12 may comprise, by way of example, a half-wave dipole 20 and a reflector 22, designed to produce a directive radiation pattern 24 symmetrical about a beam or pattern axis 26 and of the general shape indicated. A selected radiation pattern 24, here chosen by way of example, is substantially in accordance with the equation:

$$f(A)=\sin^5\left(\frac{\pi}{4}\cos A\right) \quad (1)$$

where $f(A)$ is a measure of the field strength along any line making an angle A to the beam axis 26. The pattern defined by Equation 1 is one produced by a six-element end fire binomial array with $\lambda/4$ spacing and $\pi$ phase delay between elements. This pattern is chosen because it is substantially free from minor lobes and has a major lobe shape which is typical of conventional antenna-reflector systems of the type illustrated in Fig. 1. It is understood, of course, that the equation was chosen merely for its simplicity in the following analysis, and is not intended as a limitation upon the scope of this invention. Since the same antenna is utilized for both reception and transmission, the square of Equation 1 gives its overall directivity:

$$f^2(A)=\sin^{10}\left(\frac{\pi}{4}\cos A\right) \quad (2)$$

The squared pattern, graphed to rectangular coordinates as in Figure 2 where a symmetrical half of the pattern is illustrated, thus represents relative strengths of echo-pulses received from any object or target at a given distance and whose line-of-sight makes any angle A as measured from the beam or pattern axis 26.

Dipole 20 is electrically asymmetric so that pattern axis 26 of the radiated beam is angularly displaced relative to the reference axis 28 of the reflector or antenna structure itself, as indicated in Figure 1. By means of a spinner dynamotor 30, the dipole 20 and, correspondingly, beam 24, are caused to swing or rotate about reference axis 28 so that pattern axis 26 traces or generates a conical surface whose axis is reference axis 28. This action, referred to as conical scanning, causes the angle A to cyclically vary (except when the selected target happens to be directly on the scan or reference axis 28), and the target encountered by the beam therefore experiences search-pulses of varying intensity. The echo-signals returned by the target are thus amplitude-modulated, due to the conical scanning motion imparted to beam 24 and the corresponding variation of the angle A upon which the echo-pulse intensity depends.

The manner in which angle A varies during such conical scanning may be determined by a consideration of Figure 3, in which is illustrated a general spatial relationship of scan or reference axis 28, a target line-of-sight 32, and an instantaneous position line of pattern axis 26, all extending from antenna structure 12. The reference plane P shown in Figure 3 is perpendicular to reference axis 28 at the point O, and intersects line-of-sight 32 and pattern axis 26 at Q and R, respectively. The angle between line-of-sight 32 and reference axis 28 is herein termed the deviation or lead angle B, and is generally subject only to relatively long-period variations as compared to a scanning cycle. Pattern axis 26 swings around reference axis 28 at a constant cone-generating angle C, and thus intersects plane P in a circular trace, as indicated. The angle $a$ is measured as shown, between the projections of the pattern axis 26 and line-of-sight 32 upon reference plane P, and thus varies substantially synchronously with the scanning motion of beam 24. During a conical scan cycle, therefore, and in terms as defined above and shown in Figure 3, the angle A as measured from pattern axis 26 to line-of-sight 32 varies in a manner given by the equation:

$$A = \text{arc cos } [\cos B \cos C + \sin B \sin C \cos (\pi - a)] \quad (3)$$

For a given constant value of the cone-generating angle C, and for any value of lead angle B, the variation of A and of $f^2(A)$ during conical scanning and as a function of scan angle $a$ are thus readily evaluated.

Figure 5:
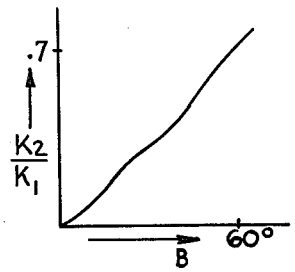
Figure 5 is a graph of an echo-signal waveform characteristic.

The resultant echo-signal modulation waveform departs from sinusoidal, and its precise shape is dependent upon the design factors of antenna pattern and cone generating angle, and upon the variable factor of deviation angle. The cone-generating angle C to be used with the squared antenna pattern shown in Figure 2 may be chosen to be about 18°, substantially at the half-power point of the pattern. The corresponding variations of $f^2(A)$ during a full cycle of the conical scanning action, and for several lead angles B, are plotted in Figure 4. The several curves shown in Figure 4 also represent the echo-signal modulation waveform, for the angle $a$ continuously varies at the uniform rate set by spinner dynamotor 30. As indicated by the graph shown in Figure 5, for the particular squared pattern and cone-generating angle C previously mentioned and chosen for purposes of illustration, the ratio $K_2/K_1$ of second harmonic to fundamental varies approximately linearly with lead angle B. A determination of the ratio $K_2/K_1$ of the modulation signal waveform therefore readily serves to identify the lead angle B, and to conveniently define its magnitude.

Having determined the magnitude of lead angle B, it now becomes necessary to determine the relative positions of line-of-sight 32 and reference axis 28, in order to fully define lead angle B. This result is attained by comparing the phase of the modulation waveform of the received signal with that of a reference signal, derived from dynamotor 30, and producing a signal representative of the phase relationship. Since dynamotor 30 determines the displacement of pattern axis 26, the instantaneous displacement of pattern axis 26 will be represented by the phase of the reference signal. Furthermore, the magnitude of the modulation waveform of the received signal from any target will have a maximum value at the instant when pattern axis 26 lies in the plane defined by reference axis 28 and line-of-sight 32, this plane being termed the deviation plane. Accordingly, if, for example, the reference signal is chosen to have a maximum value when pattern axis 26 lies in a vertical reference plane, as shown in Fig. 3, an in-phase relationship between the reference signal and the modulation waveform indicates that line-of-sight 32 is also in this vertical reference plane. In other words, in this instance, the deviation plane coincides with the vertical reference plane. Any other phase relationship indicates the relative displacement of the deviation plane and the vertical reference plane.

Since the modulation waveform of the echo-signals identifies the deviation angle B, and a phase comparison of the modulation waveform and the locally generated reference signal defines the direction of the lead plane in which deviation angle B is measured, the orientation of the selected target line-of-sight is completely determined.

Figure 6:
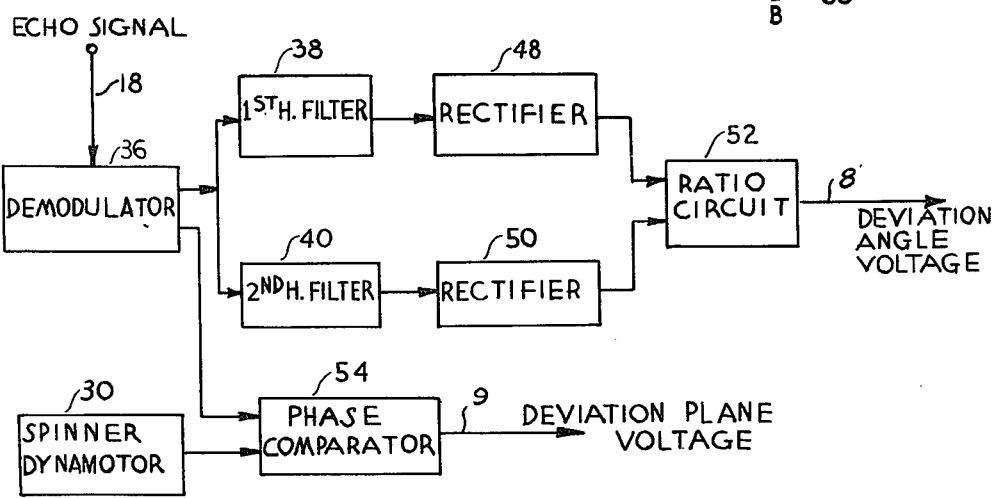
Figure 6 is a block diagram of a receiver circuit for deriving line-of-sight information.

Figure 6 illustrates in block diagram form an exemplary circuit for receiver 14 which accomplishes determination of line-of-sight orientation information. In this circuit, returned echo-pulses are applied to an amplifier and demodulator circuit 36 which isolates the modulation signal and impresses it upon first and second harmonic filters 38 and 40, respectively, designed to pass fundamental and second harmonic voltage components of the modulation signal to rectifiers or linear detectors 48 and 50, respectively. The linear outputs of rectifiers 48 and 50 are applied to a ratio-determining circuit 52 which provides at lead 8 an output corresponding to the lead angle B. From a phase comparison of signals supplied by spinner dynamotor 30 and demodulator 36, phase comparing circuit 54 provides at lead 9 an output corresponding to the deviation plane direction.

The line-of-sight information furnished by the described system may be utilized in any desired manner. In the example here illustrated, the radio-locator equipment is borne in an aircraft or missile, and the lead angle and deviation plane direction voltages furnished by a receiver as above described are applied to a computer and steering apparatus for pre-determined control of the flight path relative to the selected target.

The system receiver may, if desired, be designed to determine characteristics of the echo-signal waveform other than the ratio of second harmonic to fundamental as here described in particular, for the identification of lead angle B can be accomplished with other beam patterns, other forms of scan, and other modulation waveform characteristics. The receiver may further be designed to accept echo-signals of a selected target only, and to lock upon those signals for homing or guidance purposes.

It is characteristic of the described embodiment of the present invention, that target-location information can be determined under such adverse conditions as smoke, fog and darkness, which are ordinarily obstacles to visual determination, and that this information is translated into electrical values utilizable for automatic control purposes. Further, the described invention yields line-of-sight orientation information solely by conical scanning motion of the beam rather than by pointing the directive antenna, and thus affords the advantage of reduced equipment size and weight; for use in an aircraft or missile, the directive antenna may therefore be moved forward into the nose portion, or may in fact be formed as an array upon the aircraft or missile surface.

While the present invention has been described with reference to a pulse-type radio-echo system operating in the microwave region, the invention may be employed with other types of radio-locator systems as well. For example, a C-W doppler system, in which receiver and transmitter isolation is accomplished by means of polarized pick-up probes in a section of waveguide transmission line, may be utilized. Similarly, the invention is not limited to the use of the descrbed antenna structure including the spinning dipole, nor to the use of a beam pattern symmetrical about a beam axis and continuous within the beam pattern envelope, for suitable scanning beam patterns may be provided by many other means. For example, it may be desirable in some instances to produce the conical scan by a nutating motion of the beam to maintain a constant direction of polarization. As another example, the conically scanning beam may be provided by a linear array having a fixed feeder system provided with variable frequency excitation. As a further example, where the invention is utilized in a missile for automatic guidance thereof, the missile may be provided with a spinning nose portion, and a skewed pattern formed by an antenna structure mounted for rotation therewith. It may also be desirable to provide greater effective gain in the antenna system, as by utilizing a smaller cone-generating angle and narrow beam pattern, in the flight phases where the desired target is at its greatest distance.

It is to be further understood that while Equation 2 given above has been described as the squared beam pattern of an antenna in a two-way radio-locator system, that is, one which transmits search-signals and receives echo-signals, Equation 2 may, of course, be equivalently taken as describing the response characteristic, again along any line making the angle A to the pattern axis 26.

It will also be understood that the invention is not limited to the particular antenna arrangement or transmitter and receiver circuits here shown and described, for various modifications may be made without departing from the spirit and scope of the invention as defined by the appended claims.

I claim:

1. In a radiant energy system for determining the lead angle between a reference axis on an airborne object and the line-of-sight between the object and an airborne target, the combination comprising: radiating means for projecting electromagnetic energy into space in the form of a directive radiation pattern symmetrical about a pattern axis, said pattern axis being angularly displaced from said reference axis by a predetermined amount; means for actuating said radiating means to rotate said pattern axis about said reference axis; means for receiving the projected energy after reflection from the target; means for demodulating the received energy to produce a first output signal representative of the modulation waveform of the received energy; filter means responsive to the first output signal for producing second and third output signals representing the fundamental and second harmonic components, respectively, of said first output signal; and means for combining said second and third output signals to produce a fourth output signal representing the ratio of the magnitude of said third signal to the magnitude of said second signal, said fourth output signal being directly proportional to the lead angle.

2. The combination defined in claim 1, which further includes means responsive to said actuating means for producing a reference signal representative of the instantaneous displacement of said pattern axis relative to said reference axis; and means for combining said reference signal and said first output signal to produce a fifth output signal representing the position of the line-of-sight relative to said reference axis.

3. The combination defined in claim 2, wherein the last-named means includes a phase comparator for comprising the phase of said first output signal relative to said reference signal.

4. In a radiant energy pulse echo system for determining the lead angle between a reference axis on an airborne object and the line-of-sight between the object and an airborne target, the combination comprising: means for producing periodic pulses of electromagnetic energy; radiating means for projecting said pulses into space in the form of a directive radiation pattern symmetrical about a pattern axis, said pattern axis being angularly displaced from said reference axis by a predetermined amount; means for actuating said radiating means for rotating said pattern axis about said reference axis at a predetermined frequency; means for receiving the projected pulses after reflection from the target; means for demodulating the received pulses to produce first and second output signals representing the fundamental and second harmonic components, respectively, of the modulation waveform of the received pulses; and means for combining said first and second output signals to produce a third output signal proportional to the ratio of the magnitude of said second output signal to the magnitude of said first output signal, said third output signal being directly proportional to the lead angle.

5. In a radiant energy pulse echo system for determining the angular deviation between a reference axis on an airborne object and the line-of-sight between the object and an airborne target, the combination comprising: means for generating periodic pulses of electromagnetic energy; radiating means for projecting said pulses into space in a solid conical angle, the axis of said conical angle coinciding with said reference axis; means for receiving the projected pulses after reflection from the target; means for demodulating the received pulses to produce first and second output signals representing the fundamental and second harmonic components, respectively, of the modulation waveform of the received pulses; and means for combining said first and second output signals to produce a third output signal proportional to the ratio of the magnitude of said second output signal to the magnitude of said first output signal, said third output signal being directly proportional to the magnitude of the angular deviation.

6. The combination defined in claim 5, which further includes means electrically coupled to said radiating means and to said receiving means for producing a fourth output signal representing the direction of the angular deviation.

7. In a radiant energy system for determining the angular deviation between a reference axis on an airborne object and the line-of-sight between the object and an airborne target, the combination comprising: radiating means for projecting electromagnetic energy into space in a solid conical angle, the axis of said conical angle coinciding with said reference axis; means for receiving the projected energy after reflection from the target; means for harmonically analyzing the received energy to produce a first output signal representing the ratio of the magnitude of the second harmonic component to the magnitude of the fundamental component of the modulation waveform of the received energy, the magnitude of said first output signal being proportional to the magnitude of the angular deviation; and means electrically coupled to said radiating means and to said receiving means for producing a second output signal representing the direction of the angular deviation.

8. A radiant energy guiding system for controlling the flight course of an airborne object relative to an airborne target, said system comprising: radiating means for projecting electromagnetic energy into space in the form of a directive radiation pattern symmetrical about a pattern axis, said pattern axis being angularly displaced from a reference axis on the airborne object by a predetermined amount; means for actuating said radiating means to rotate said pattern axis about said reference axis at a predetermined frequency; means for receiving the projected energy after reflection from the airborne target; means for demodulating the received energy to produce first and second output signals proportional to the fundamental and second harmonic components, respectively, of the modulation waveform of the received energy; means for combining said first and second output signals to produce a third output signal proportional to the ratio of the magnitude of said second output signal to the magnitude of said first output signal, said third output signal being directly proportional to the angular deviation of the line-of-sight to the target with respect to said reference axis; means responsive to said actuating means for producing a reference signal representing the instantaneous displacement of said pattern axis relative to said reference axis; means electrically coupled to the last-named means and responsive to the received energy for producing a fourth output signal representing the direction of the line-of-sight relative to said reference axis; and automatic control means responsive to said third and fourth output signals for continuously reorienting the flight course of the airborne object so that said reference axis coincides with the determined position of the line-of-sight.

9. A radiant energy control system for directing an airborne object toward an airborne target, said system comprising: radiating means for projecting electromagnetic energy into space in a solid conical angle, the axis of said conical angle coinciding with a reference axis on the airborne object; means for receiving the projected energy after reflection from the airborne target; means for demodulating the received energy to produce first and second output signals representing the fundamental and second harmonic components, respectively, of the modulation waveform of the received energy; means for combining said first and second output signals to produce a third output signal proportional to the ratio of the magnitude of the second output signal to the magnitude of the first output signal, said third output signal being directly proportional to the magnitude of the angular deviation of the line-of-sight to the target with respect to said reference axis; means responsive to the received energy for producing a fourth output signal representing the direction of the angular deviation of the line-of-sight with respect to said reference axis, the last-named means being electrically coupled to said radiating means and to said receiving means; and automatic control means responsive to said third and fourth output signals for continuously reorienting the flight course of the airborne object to position said reference axis in coincidence with the determined position of the line-of-sight.

WILLIAM F. PRIEST.

References Cited in the file of this patent
UNITED STATES PATENTS

| Number | Name | Date |
| --- | --- | --- |
| 2,083,242 | Runge | June 8, 1937 |
| 2,176,469 | Moueix | Oct. 17, 1939 |
| 2,407,287 | Labin | Sept. 10, 1946 |
| 2,409,448 | Rost | Oct. 15, 1946 |
| 2,419,025 | Mercer | Apr. 15, 1947 |
| 2,426,654 | White | Sept. 2, 1947 |
| 2,432,101 | Shepherd | Dec. 9, 1947 |
| 2,434,813 | Sanders | Jan. 20, 1948 |
| 2,441,956 | Deloraine | May 25, 1948 |
| 2,448,007 | Ayres | Aug. 31, 1948 |
| 2,449,517 | Stout | Sept. 14, 1948 |
| 2,458,175 | Kolding | Jan. 14, 1949 |
| 2,473,175 | Ridenour | June 14, 1949 |
| 2,499,349 | Ayres | Mar. 7, 1950 |
| 2,512,693 | Sparks | June 27, 1950 |